United States Patent [19]
Johnson

[11] 3,964,299

[45] June 22, 1976

[54] STRAIN INDICATOR

[75] Inventor: Robert Carol Johnson, Pittsburgh, Pa.

[73] Assignee: Modulus Corporation, Cleveland, Ohio

[22] Filed: June 20, 1974

[21] Appl. No.: 481,042

[52] U.S. Cl. .................................. 73/88 F; 85/62; 116/DIG. 34
[51] Int. Cl.² .......................................... F16B 31/02
[58] Field of Search ............... 73/88 A, 88 F; 85/62; 116/DIG. 34

[56] References Cited
UNITED STATES PATENTS 3,799,108  3/1974  Mosow ........................... 116/114 R

*Primary Examiner*—Charles A. Ruehl
*Attorney, Agent, or Firm*—Fay & Sharpe

[57] ABSTRACT

A strain indicator of the type wherein a change in length of a strain member produces a change in color of a visual indicator. An indicator area and a light-absorbing indicator fluid are encapsulated in a member that also includes a window. The capsule is fastened to the strain member with an adhesive. A change in length of the strain member causes the indicator area to become separated from the window with the result that light-absorbing indicator fluid is caused to flow between the indicator area and the window.

5 Claims, 4 Drawing Figures

STRAIN INDICATOR

CROSS REFERENCE TO RELATED APPLICATIONS

U.S. patent applications Ser. Nos. 207,260 filed Dec. 13, 1971 (now U.S. Pat. No. 3,799,108); Ser. No. 310,445 filed Nov. 29, 1972 (now U.S. Pat. No. 3,850,133); Ser. No. 479,274 filed June 14, 1974; and Ser. No. 494,638 filed Aug. 5, 1974 all disclose and claim fluid type strain indicators owned by Modulus Corporation the assignee of this application.

BACKGROUND OF THE INVENTION

This invention relates to strain indicators of the type shown in U.S. Pat. Nos. 3,602,186 and 3,799,108. More particularly, this invention relates to a strain indicator apparatus of the type wherein a change in length of a strain member produces a change in color of a visual indicator.

In many assembly operations where fastening devices are used it is desirable to inspect the assembled fastener to determine that it has been taken up an appropriate amount. The fastener may be, for example, a stud, a bolt, a rivet or the like.

Several prior art techniques have been utilized for determining when a fastener has been properly taken up. One such technique involves the use of a torque wrench in which a specified number of foot pounds may be verified as having been applied to a fastener in the assembly thereof. Other prior art techniques have made use of the fact that take-up of a fastener will set up certain stress levels in the fastener which may be measured as, for instance, by means of stress sensitive material. Still further prior art techniques have made use of the fact that take-up of a fastener produces an elongation of the fastener which may be measured utilizing well known techniques such as direct measuring devices.

The above examples demonstrate that fastener take-up may be measured by determining either torque, stress or strain values in a fastener.

Since torque, stress and strain are all interrelated, it is possible to determine the stress levels in a fastener knowing the strain of the fastener. Similarly, it is possible to determine torque values knowing the stress imparted to the fastener at any point. Thus, for purposes of illustration, the terms torque, stress and strain may be used interchangeably. The device of this invention is termed a strain indicator because the elongation of the fastener is being sensed in order to determine a fully made-up condition of the fastener. The term strain indicator should not be considered as limiting since in its broadest sense the device of this invention may be considered a stress or torque indicator as well. In U.S. Pat. Nos. 3,602,186 and 3,799,108 there are shown and described strain indicators of the type wherein a change in length of the fastener causes an indicator area of a pin to separate from a window with the result that light-absorbing indicator fluid is caused to flow between the indicator area and the window.

This invention is directed to an improved strain indicator of the type wherein a change in length of the fastener produces a visual indication at the head of the fastener.

SUMMARY OF THE INVENTION

Briefly summarized, the strain indicator of this invention comprises a threaded bolt having a bore extending from the bolt head into the body. A pin member is received within the bore. The inner end of the pin member is fixed to the fastener by means of an adhesive. The free end of the pin member is affixed to and made a part of a fluid holding member which itself is attached to the fastener. The fluid holding member is comprised of a generally cylindrical ferrule member, a window and a seal. A shoulder of the pin member is caused to be adhered to the seal. A brightly colored indicator area is provided at the end of the pin member and is adapted to be disposed adjacent the window of the capsule. The capsule is filled with a light-absorbing indicator fluid. As the length of the threaded fastener is changed, the indicator area separates from the window with the result that light-absorbing indicator fluid is caused to flow between the indicator area and the window. The fluid absorbs the color of the indicator area giving a visual indication that proper take-up of the fastener has been accomplished.

BRIEF DESCRIPTION OF THE DRAWINGS

A more complete description of the invention will now be made with reference to the accompanying drawings in which.

DESCRIPTION OF THE PREFERRED EMBODIMENT

Figure 1:
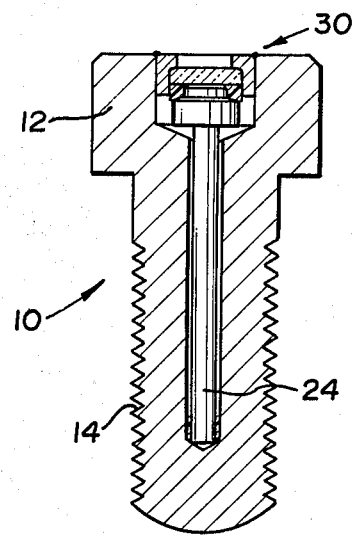
FIG. 1 is a cross-sectional view of a fastener incorporating the indicating feature of this invention.

Turning now to FIG. 1, the apparatus of this invention includes a fastener 10 having a head 12 and external threads 14. Head 12 may be in any desired configuration making it possible to turn the fastener with a suitable tool such as a wrench.

An axial bore 16 (FIG. 3) is drilled from the head of the fastener a substantial distance into the fastener body. A counterbore 18 is provided at the head 12 in order to receive the indicator unit as will be described more fully hereafter.

Pin member 24 is provided with a first end 26 adapted to be received within the bore 16 and a second end 28 adapted to be secured to the capsule 30.

Figure 2:
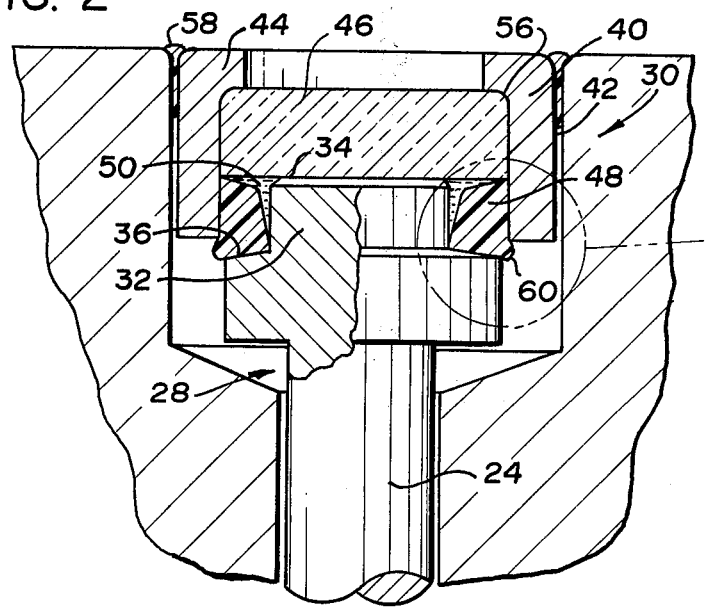
FIG. 2 is an enlarged fragmentary elevational cross-sectional view of the indicator portion of the apparatus of this invention with the fastener in an unstressed condition.

As is shown more clearly in FIG. 2, the second end 28 of pin member 24 includes head portion 32 and an indicator area 34 which is a brightly colored planar surface of the head portion disposed essentially transverse to the axis of the pin member 24. The color selected for the indicator area 34 is preferably a highly visible coating of red-orange. As will be apparent as the description proceeds, other colors may be selected depending upon particular conditions.

Adjacent the head portion 32 of the pin member 24 is a shoulder 36 the function of which will be described with reference to the sealing structure of the capsule.

The first end 26 of the pin member 24 (FIG. 3) is fastened to the wall defining the bore 16 by means of an adhesive 38 which may be applied to either one or both of the surfaces of the pin member 24 and the wall of bore 16 prior to assembly. Alternate structures for securing the pin member 24 to the interior wall of the fastener 10 should be considered within the spirit of this invention including, but not limited to, screw threads or a press fit.

Turning now to FIG. 2, capsule 30 is a fluid holding member defined by a ferrule member 40 having a side wall 42 and an outer wall 44. A window 46 is secured to the ferrule member. A sealing washer 48 cooperates with pin member 24 to define an inner wall of the capsule. In the preferred embodiment sealing washer is defined by a beveled upper surface 62 and a beveled lower surface 64. Surface 62 serves to accommodate fluid 50 in the condition shown in FIG. 3.

The elements 40, 46, 48 and 24 thus cooperate to define a fluid holding member capable of retaining light-absorbing indicator fluid 50 within the confines of such member.

It will thus be observed from FIG. 2 that the head portion 32 of the pin member 24 including the indicator area 34 is encapsulated within the fluid holding member along with light-absorbing indicator fluid 50.

In the preferred embodiment adhesive is applied to the shoulder 36 of the pin member 24 in order to effect a seal at the sealing washer 48.

The window 46 is retained within the capsule 30 by means of adhesive 56 applied either to the window or to the internal surface of the essentially cylindrical ferrule member 40.

Window 46, in the preferred embodiment, is manufactured from tempered glass such as Pyrex. The internal surface 54 of window 46 is essentially planar and complementary to the indicator area 34 such that in the position shown in FIG. 2 the indicator area 34 is in contact with the internal surface 54 with the result that there is essentially no light-absorbing indicator fluid 50 between these members. In the position shown in FIG. 2, therefore, the brightly colored indicator area 34 is clearly visible through the window 46 and indicates an unstressed condition of the fastener.

As will be evident from FIG. 2, the side wall 42, outer wall 44 and the window 46 cooperate to define a generally cup-shaped member into which is disposed the light-absorbing indicator fluid 50, the sealing washer 48 and the head portion 32 of pin member 24 during assembly.

Assembly and sealing of the indicator is accomplished in the following manner. The window 46 is initially sealed in place within the ferrule member 40 using adhesive 56 applied to either one or both of these members as has previously been described. The sealing washer 48 is then sealed in place within the ferrule in an undistorted position by applying adhesive to either one or both of the mating surfaces of the sealing washer and the ferrule. Thereafter the ferrule is placed in an inverted position and a measured quantity of light-absorbing indicator fluid 50 is dropped into the capsule through the opening of the sealing washer. The shoulder 36 of the pin member 24 is then coated with an adhesive and the head portion 32 of the pin member is inserted into the sealing washer with only sufficient pressure to effect the seal with member 48.

The assembly including the ferrule member 40, window 46, sealing washer 48, light-absorbing indicator fluid 50 and pin member 24 is then inserted into the bore of the bolt after first having applied adhesive 38 (to either one of the cooperating surfaces of the pin member or the wall defining bore 16) and adhesive 58 (to either one of the surfaces of the counterbore 18 or the side wall 42). Sufficient pressure is applied to the ferrule member to press the indicator area 34 at the head portion 32 of the pin firmly against the internal surface 54 of the window 46. Adhesive 58 is then permitted to set.

Once assembled, the fastener in the unstressed condition of FIG. 2, is ready for use. With the indicator area 34 contacting the window 46 a bright color is apparent to an observer indicating the unstressed condition of the bolt.

Figure 3:
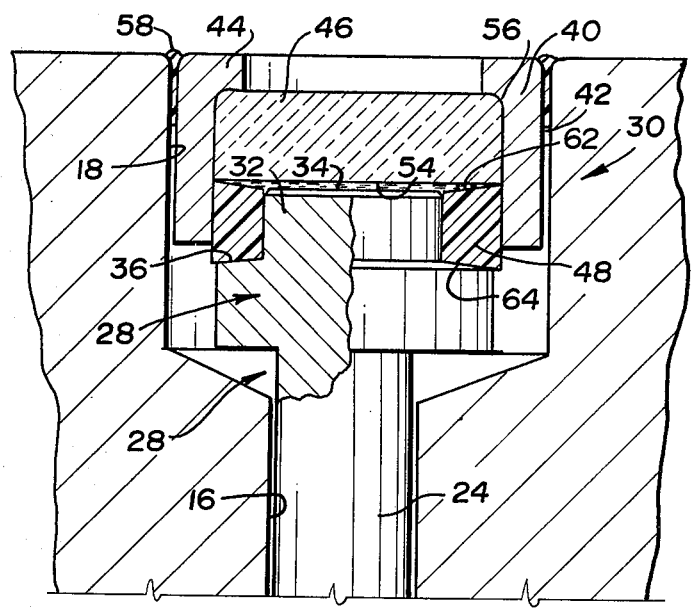
FIG. 3 is an enlarged fragmentary elevational cross-sectional view of the indicator portion of the apparatus of this invention with the fastener in a stressed condition.

When assembled in the configuration shown in FIG. 2, the fastener is in condition for use and exhibits a visual indication of elongation or stress in the following manner. When the fastener is taken up and placed in a stress condition, it will elongate causing the indicator area 34 to separate from the window 46 as shown in FIG. 3. Light-absorbing indicator fluid 50 will flow between the indicator area and the window causing a change in appearance of the color of the indicator area. This change in appearance is essentially linear in proportion to the depth of film of light-absorbing indicator fluid. If the fluid is very opaque or of very high light-absorbing power, a film thickness on the order of 0.001 inches is sufficient to change the appearance of the bright red-orange color of the indicator area 34 to the characteristic color of the fluid which, in the preferred embodiment, is a deep blue.

The strain at which the change of appearance effectively occurs can be well controlled by controlling the optical density or light absorbing power of the fluid. It has been found in practice that the fastener can be calibrated to show the change in color of the indicator area within 10 per cent of a precalculated strain specification.

The slight elongation of the fastener during take-up which produces a gap between the pin member and the window is elastic. Thus, the strain indicator is reversible and if the fastener should become loosened the bright color of the indicator area 34 will become visible thereby providing warning of the loose condition.

In the preferred embodiment the light-absorbing indicator fluid 50 is a mineral oil in which has been dissolved a dye powder. Other fluid compositions should be considered within the spirit and scope of this invention.

Figure 4:
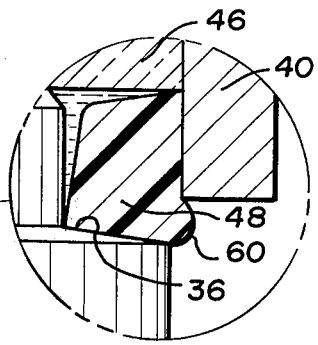
FIG. 4 is an enlarged fragmentary elevational cross-sectional view taken from the circled area in FIG. 2.

A principle utilized in the operation of the strain indicator of this invention is that the internal space occupied by the fluid in the capsule is always constant even though the fluid moves about within the capsule. During assembly, as the ferrule is pressed downward in order to bring the window and the head portion of the pin member into contact, fluid is forced down the internal wall of the sealing washer 48 as is shown in FIG. 2. This movement of fluid causes the washer to bulge outwardly at the unsupported lower corner 60 into the free space created by the counterbore 18 as is shown somewhat exaggerated in FIG. 4. There is no vacuum created as a result of fluid movement since the sealing washer only moves as far as the displaced fluid demands. Upon movement of the pin member in a downward direction (as the indicator area 34 separates from the internal surface 54 of window 46) fluid returns to fill the space between these members creating a change in visual appearance at the head of the fastener.

Thus it is to be observed that the sealing washer 48 is under compression only when the fastener is in an unstressed condition, i.e., the condition shown in FIG. 2. Upon elongation of the fastener, with a resulting shift in fluid, the stress condition of the sealing washer is removed as it assumes the condition shown in FIG. 3.

It should be noted that expansion and contraction of fluid due to temperature change are absorbed by the sealing washer and do not affect the performance of the indicator of this invention.

It will further be noted that in the assembly of the apparatus of this invention the application of a force to the capsule in a downward direction as shown in FIG. 2 prior to the time that the adhesive at the capsule and the pin member sets insures that the brightly colored indicator area will be very closely adjacent if not in actual contact with the window and thus will be clearly visible when the fastener is in the unstressed condition. Thus, variations in the dimensions of the components such as, for example, the length of the pin member, will not result in a rejection of the indicator when assembly is completed. Nor will there be a misalignment of the components of the assembly or a positioning of the indicator area with respect to the window in such a manner that a change in the stress condition of the fastener is not apparent.

The indicator subassembly of this invention can be assembled into virtually any type of strain member whether it be a bolt, rod or other machine element. Special fasteners and elements can readily be adapted to receive the indicator subassembly of this invention.

It should be emphasized again that whereas the term strain indicator has been used throughout the description of this invention this phrase has been selected because a strain in a member produces movement of the pin member which produces an apparent color change to an observer. Since strain, stress and torque are interrelated, the apparatus of this invention may well be termed a stress indicator or a torque indicator. The use of the term strain indicator, thus, should not be considered as limiting the invention.

Throughout the description of the invention reference has been made to a strain member and the elongation of a strain member which produces an apparent change in color in an indicator. Within the spirit of this invention, however, should be considered compression members in which a shortening of the length of a member causes a window, initially separated from an indicator area, to come into contact with it producing a similar but opposite apparent change in color of the indicator to an observer. This invention, therefore, should be considered sensitive to any change in length of a member whether it be an increase in length or a decrease in length.

While in the preferred embodiment adhesive has been used to join the capsule and the pin member to the threaded fastener other means, known to those skilled in the art, should also be considered within the spirit of this invention.

Similarly alternate sealing structures at the capsule in order to accommodate the pin member such as, for example, a bellows or other such structure should be considered within the spirit of this invention.

What is claimed is:

1. An optical stress-strain indicator comprising in combination:

a first member subject to stress-strain and having a recess extending from an external surface of said member into said member;

a pin member received within said recess and having a first end and a second end, said first end being secured to said first member at an interior portion thereof;

a fluid holding member having a wall portion and a window;

said fluid holding member being at least partially received within said first member and secured to said first member at said wall portion with said window positioned with respect to said first member so as to be visible;

said second end of said pin member received in said fluid holding member;

a light absorbing indicator fluid in said fluid holding member substantially filling said fluid holding member while remaining out of contact with said first member;

an indicator member in said fluid holding member having an indicator area disposed substantially adjacent said window;

sealing means between said pin member and said fluid holding member, said sealing means comprising a sealing member having a portion thereof secured to said fluid holding member with another portion thereof secured to said pin member, said sealing member being flexible to permit relative movement of said pin member with respect to said window;

means permitting the cross-sectional shape of said sealing member to change upon relative movement of said pin member with respect to said window such that the internal space occupied by said fluid in said fluid holding member is always constant with or without movement of said pin member;

means operatively connecting said indicator member with said second end of said pin member, whereby;

upon application of stress to said first member there is accomplished a change in length of said first member with the result that said pin is caused to move axially thereby causing said second end and said indicator member to move simultaneously in the same direction with the consequence that said indicator area moves from said window and indicator fluid is caused to flow between said indicator area and said window, the volume of the space within said fluid holding member containing said fluid remaining constant.

2. The invention of claim 1 in which said indicator member is integral with said second end of said pin member.

3. The invention of claim 1 in which said sealing member is partially received within said fluid holding member and secured thereto and said pin member is at least partially received within said sealing member and secured thereto.

4. The invention of claim 1 in which said sealing member is partially received in said fluid holding member with a portion extending outside of said fluid holding member, the portion extending outside of said fluid holding member permitting at least a part of said sealing member to expand in a radial direction to accommodate movement of said fluid within said fluid holding member.

5. The invention of claim 4 in which the radial movement of said sealing member provides for a flow of fluid between said sealing member and said pin member.

* * * * *